United States Patent
Liang et al.

(10) Patent No.: US 9,622,194 B2
(45) Date of Patent: Apr. 11, 2017

(54) COMMUNICATION SYSTEM

(71) Applicant: NEC Corporation, Tokyo (JP)

(72) Inventors: Caroline Liang, Tokyo (JP); Yassin Aden Awad, Tokyo (JP); Yasushi Maruta, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 14/376,828

(22) PCT Filed: Jan. 15, 2013

(86) PCT No.: PCT/JP2013/051018
§ 371 (c)(1),
(2) Date: Aug. 5, 2014

(87) PCT Pub. No.: WO2013/118567
PCT Pub. Date: Aug. 15, 2013

(65) Prior Publication Data
US 2015/0016374 A1    Jan. 15, 2015

(30) Foreign Application Priority Data

Feb. 8, 2012  (GB) .................................. 1202216.6

(51) Int. Cl.
*H04L 1/00* (2006.01)
*H04W 52/24* (2009.01)
(Continued)

(52) U.S. Cl.
CPC ......... *H04W 52/245* (2013.01); *H04W 52/16* (2013.01); *H04L 1/0026* (2013.01);
(Continued)

(58) Field of Classification Search
CPC ..... H04W 72/04; H04W 72/05; H04W 72/06; H04W 84/08; H04W 84/09; H04W 84/10;
(Continued)

(56) References Cited

U.S. PATENT DOCUMENTS

| 2014/0198744 A1* | 7/2014 | Wang | ................... | H04B 7/0617 370/329 |
| 2014/0286283 A1* | 9/2014 | Kim | .................... | H04W 52/243 370/329 |

FOREIGN PATENT DOCUMENTS

JP    2012-253407 A    12/2012
WO   WO 2012/064085 A1    5/2012
(Continued)

OTHER PUBLICATIONS

International Search Report in PCT/JP2013/051018 dated Apr. 19, 2013 (English Translation Thereof).
(Continued)

*Primary Examiner* — Dady Chery
(74) *Attorney, Agent, or Firm* — Wilmer Cutler Pickering Hale and Dorr LLP

(57) ABSTRACT

A communication system in which a mobile communication device communicates with communication apparatus of the communication system uses radio frames that include a plurality of sub-frames. The mobile communication device receives information for use in identifying a first power ratio, said first power ratio representing a ratio of a power used by the communication apparatus for transmitting a reference signal to a first power used for transmitting data in a first sub-frame of a radio frame. The mobile communication device receives information for use in identifying and a second power ratio, the second power ratio representing a ratio of a power used by the communication apparatus for transmitting a reference signal to a second power used for transmitting data in a second sub-frame of said radio frame. The mobile communication device generates a measurement report including information calculated in dependence on at least one of the first and second power ratio.

31 Claims, 6 Drawing Sheets

(51) Int. Cl.
*H04W 52/16* (2009.01)
*H04W 24/10* (2009.01)
*H04W 52/38* (2009.01)

(52) U.S. Cl.
CPC .......... *H04W 24/10* (2013.01); *H04W 52/241* (2013.01); *H04W 52/244* (2013.01); *H04W 52/38* (2013.01)

(58) Field of Classification Search
CPC ..... H04W 84/12; H04W 84/13; H04W 84/14; H04W 84/15
USPC ........ 370/329, 330, 341, 343, 348; 455/450, 455/452.22
See application file for complete search history.

(56) References Cited

FOREIGN PATENT DOCUMENTS

WO  WO 2012/065033 A1  5/2012
WO  WO 2012/154094 A1  11/2012

OTHER PUBLICATIONS

3 GPP TS 36.423 v10.4.0 (Sep. 2011) 3rd Generation Partnership Project; Technical Specification Group Radio Access Network; Evolved Universal Terrestrial Radio Access Network (E-UTRAN);X2 application protocol (X2AP) (Release 10).
3GPP TS 36.331 V10.4.0 (Jun. 2011) 3rd Generation Partnership Project; Technical Specification Group Radio Access Network; Evolved Universal Terrestrial Radio Access (E-UTRA);Radio Resource Control (RRC); Protocol specification (Release 10).
36 PP TS 36.213. V.10.4.0 (Dec. 2011) Qualcomm Incorporated : "Signaling support for non-zero transmit power ABS" ,3GPP Draft; R1-120541 Signaling Support for Non-Zero Transmit Power ABS, 3$^{rd}$ Generation Partnership Project (3GPP) ,Mobile Competence Centre ., 650, Route Des Lucioles, F-06921 Sophia-Anti Polis Cedex; France vol. RAN WG1, No. Dresden, Germany; 20120206-20120210, Jan. 31, 2012 (Jan. 31, 2012), XP050562979.
Hitachi Ltd: "Specification Impact of Non-Zero Power ABS", 3GPP Draft; R1-120241 Specification Impact of Non-Zero Power ABS, 3$^{rd}$ Generation Partnership Project (3GPP), Mobile Competence Centre; 650, Route Des Lucioles ; F-06921 Sophia-Antipolis Cedex ; France, vol. RAN WG1, No. Dresden, Germany; 20120206-20120210, Jan. 31, 2012 (Jan. 31, 2012), XP050562796.
NEC Group: "Signaling support for non-zero transmission power ABS", 3GPP Draft; R1-120250 Signalling Support for Non-Zero Transmission Power ABS, 3$^{rd}$ Generation Partnership Project (3GPP), Mobile Competence Centre; 650, Route Des Lucioles ; F-06921 Sophia-Antipolis Cedex; France, vol. RAN WG1, No. Dresden, Germany; 20120206-20120210, Feb. 2, 2012 (Feb. 2, 2012), XP050563301.
Research in Motion UK Limited: "Signaling enhancements to support non-zero transmit power in ABS operation", 3GPP Draft; R1-120334, 3$^{rd}$ Generation Partnership Project (3GPP), Mobile Competence Centre ; 650, Route Des Lucioles ; F-06921 Sophia-Antipolis Cedex; France, vol. RAN WG1, No. Dresden, Germany; 20120206-20120210, Jan. 31, 2012 (Jan. 31, 2012), XP05056286.
Ericsson et al: "Signalling support for reduced non-zero power ABS". 3GPP Draft; R1-120804. 3rd Generation Partnership Project (3GPP). Mobile Competence Centre ; 650. Route Des Lucioles ; F-06921 Sophia-Antipolis Cedex; France.vol. RAN WG1. No. Dresden. Germany; 20120206-20120210. Jan. 31, 2012 (Jan. 31, 2012). XP050563147.
Qualcomm Incorporated: "Overview of eICIC backhaul procedure". 3GPP Draft; R3-103414. 3rd Generation Partnership Project (3GPP). Mobile Competence Centre ; 650. Route Des Lucioles ; F-06921 Sophia-Antipolis Cedex; France. vol. RAN WG3. No. Jacksonville. USA; 20101115. Nov. 9, 2010 (Nov. 9, 2010). XP050496731.
Ericsson: "Introduction of eICIC support in RAN3 specifications". 3GPP Draft; R3-103494, 3rd Generation Partnership Project (3GPP). Mobile Competence Centre; 650, Route Des Lucioles ; F-06921 Sophia-Antipolis Cedex; France, vol. RAN WG3. No. Jacksonville. USA; 20101115. Nov. 8, 2010 (Nov. 8, 2010). XP050466400.
3 GPP TSG-RAN WG1 # 64 Taiwan, Taipei, Feb. 21-25"LS reply on coexistence of frequency domain and time domain ICIC," RAN 1, R1-111197.
NEC Group: "Signalling support for non-zero transmission power ABS". 3 GPP TSG RAN WG1 Meeting # 68 R1-120888, Dresden, Germany, Feb. 6-10, 2012.
3 GPP TSG RAN WG1 Meeting # 67 San Francisco, CA, USA Nov. 14-18, 2011, "RAN1 Chairman's Notes".
ETRI, "Solutions for the macro-pico interference scenario," 3GPP TSG-RAN WG3 Meeting #73bis, R3-112439, Zhuhai, China, 11 pages (Oct. 10-14, 2011).
LG Electronics, "Considerations on Coexistence of Frequency and Time Domain ICIC," 3GPP TSG RAN WG1, Meeting #64, R1-110889, Taipei, Taiwan, 4 pages (Feb. 21-25, 2011).
LG Electronics, "Open Issues on Non-zero Power ABS," 3GPP TSG RAN WG1 Meeting #68, R1-120426, Dresden, Germany, 3 pages (Feb. 6-10, 2012).
Japanese Office Action issued by the Japan Patent Office for Application No. 2015-172838 dated Aug. 24, 2016 (6 pages).
Japanese Office Action issued in Japanese Patent Application No. 2015-172838, dated Jan. 25, 2017, 3 pages.
Nokia Siemens Networks, Nokia Corporation "Signaling Impacts for low-power ABS concept", 3GPP TSG-RAN WG2 Meeting #77, R2-120530, Dresden, Germany, Feb. 6-10, 2012, 2 pages.
3 GPP TS 36.423 v10.4.01(Dec. 2011) 3rd Generation Partnership Project; Technical Specification Group Radio Access Network; Evolved Universal Terrestrial Radio Access Network (E-UTRAN);X2 application protocol (X2AP) (Release 10).

* cited by examiner

COMMUNICATION SYSTEM

TECHNICAL FIELD

The present invention relates to mobile communication devices and networks, particularly but not exclusively those operating according to the 3rd Generation Partnership Project (3GPP) standards or equivalents or derivatives thereof. The invention has particular although not exclusive relevance to the Long Term Evolution (LTE) of UTRAN (called Evolved Universal Terrestrial Radio Access Network (E-UTRAN)).

In radio communications networks, traditionally, a given geographical area is divided into cells. Each cell of a network (thus each mobile communication device within a cell) is served by a base station. The operation of the base stations is controlled by a base station controller, which might be implemented as part of the base stations or as a separate entity. The base stations are capable of dynamically adjusting their transmission power and/or direction to ensure optimum radio channel quality to the served mobile communication devices.

In relatively small geographical areas, such as office buildings or similar, where additional network capacity or a specific set of services are needed, so-called 'pico' cells may be implemented within (or partially overlapping with) the regular (i.e. 'macro') cells of the radio network. In some cases, a pico cell covers a home or a single room only. Pico cells effectively form parts of a larger network infrastructure, while providing services within a smaller coverage area.

In order to maximise usage of system resources, transmissions by base stations serving these macro and pico cells need to be synchronised in order to avoid or reduce harmful interference between them and interference caused to mobile communication devices served by the base stations. Therefore, the power of transmission may be selected by the base stations so that a maximum number of mobile communication devices can be served in parallel and at an optimum data rate without compromising transmission quality. Transmission power can be controlled on a base station level or cell level, whilst specific power levels can also be assigned to each mobile communication device and/or communication units (such as frames, sub-frames, resource elements, resource blocks, symbols) used to exchange data between the base stations and mobile communication devices. The relevant aspects of LTE networks have been specified in 3GPP TS 36.331 v10.4.0 and 3GPP TS 36.213 v10.4.0, which are available for download from the 3GPP website.

However, current proposals fail to address some specific aspects of transmission power control. In particular, errors can occur in channel quality measurements when communication units are transmitted at a reduced power. Specifically, as part of a feedback mechanism employed by LTE, the mobile communication devices might incorrectly indicate a signal quality degradation to their serving base station when transmission power is temporarily adjusted to eliminate inter-cell interference.

Another problem is that communication systems ideally remain backward compatible, thus any established mechanisms can not be changed in way that would affect mobile communication devices operating according to an earlier release of the relevant standard.

However, as these communication systems are getting increasingly complex, introducing novel mechanisms is a difficult challenge.

The invention aims to provide an alternative system for controlling system resources in a mobile communication network.

SUMMARY OF THE INVENTION

According to one aspect of the invention there is provided a mobile communication device for a cellular communication system, the mobile communication device comprising: means for communicating with communication apparatus of said cellular communication system using radio frames that comprise a plurality of sub-frames; wherein the means for communicating comprises: means for receiving, from said communication apparatus: information for use in identifying a first power ratio, said first power ratio representing a ratio of a power used by the communication apparatus for transmitting a reference signal to a first power used for transmitting data in a first sub-frame of a radio frame; and information for use in identifying a second power ratio, said second power ratio representing a ratio of a power used by the communication apparatus for transmitting a reference signal to a second power used for transmitting data in a second sub-frame of said radio frame; and means for transmitting, to said communication apparatus, a measurement report comprising information calculated in dependence on at least one of said first and second power ratio.

According to one aspect of the invention there is provided communication apparatus for a cellular communication system, the communication apparatus comprising: means for communicating with mobile communication devices of said cellular communication system using radio frames that comprise a plurality of sub-frames; wherein the means for communicating comprises: means for transmitting, to a mobile communication device: information for use in identifying a first power ratio, said first power ratio representing a ratio of a power used for transmitting a reference signal to a first power used for transmitting data in a first sub-frame of a radio frame; and information for use in identifying a second power ratio, said second power ratio representing a ratio of a power used for transmitting a reference signal to a second power used for transmitting data in a second sub-frame of said radio frame; and means for receiving, from said mobile communication device, a measurement report comprising information calculated in dependence on at least one of said first and second power ratio.

According to one aspect of the invention there is provided a method performed by a mobile communication device of a cellular communication system, the method comprising: communicating with communication apparatus of said cellular communication system using radio frames that comprise a plurality of sub-frames; wherein the communicating comprises: receiving, from said communication apparatus: information for use in identifying a first power ratio, said first power ratio representing a ratio of a power used by the communication apparatus for transmitting a reference signal to a first power used for transmitting data in a first sub-frame of a radio frame; information for use in identifying a second power ratio, said second power ratio representing a ratio of a power used by the communication apparatus for transmitting a reference signal to a second power used for transmitting data in a second sub-frame of said radio frame; and transmitting, to said communication apparatus, a measurement report comprising information calculated in dependence on at least one of said first and second power ratio.

According to one aspect of the invention there is provided a method performed by communication apparatus of a cellular communication system, the method comprising:

communicating with mobile communication devices of said cellular communication system using radio frames that comprise a plurality of sub-frames; wherein the communicating comprises: transmitting, to a mobile communication device: information for use in identifying a first power ratio, said first power ratio representing a ratio of a power used for transmitting a reference signal to a first power used for transmitting data in a first sub-frame of a radio frame; and information for use in identifying a second power ratio, said second power ratio representing a ratio of a power used for transmitting a reference signal to a second power used for transmitting data in a second sub-frame of said radio frame; and receiving, from said communication device, a measurement report comprising information calculated in dependence on at least one of said first and second power ratio.

According to one aspect of the invention there is provided mobile communication device for a cellular communication system, the mobile communication device comprising means for receiving, from communication apparatus, information for use in identifying a power ratio representing a ratio of a power used for transmitting a reference signal to a power used for transmitting data in a sub-frame of a radio frame, wherein said power ratio is varies in dependence on which sub-frame of said radio frame said power ratio relates to; and means for generating a measurement report comprising information calculated in dependence on said power ratio.

According to one aspect of the invention there is provided communication apparatus for a cellular communication system, the communication apparatus comprising means for transmitting, to a mobile communication device information for use in identifying a power ratio representing a ratio of a power used for transmitting a reference signal to a power used for transmitting data in a sub-frame of a radio frame, wherein said power ratio varies in dependence on which sub-frame of said radio frame said power ratio relates to.

According to one aspect of the invention there is provided a base station for a cellular communication system, the base station comprising: means for communicating with a plurality of mobile communication devices of said cellular communication system using a plurality of resource blocks allocated to the mobile communication devices; and means for communicating with a further base station wherein, the means for communicating comprises means for transmitting to and/or for receiving from, the further base station, resource block related information identifying at least one of an overload, interference and a power restriction associated with at least one of said plurality of resource blocks.

According to one aspect of the invention there is provided a method performed by a base station of a cellular communication system, the method comprising: communicating with a plurality of mobile communication devices of said communication system using a plurality of resource blocks allocated to the mobile communication devices; and communicating with a further base station wherein, the communicating comprises transmitting to and/or receiving from, the further base station, resource block related information identifying at least one of an overload, interference and a power restriction associated with at least one of said plurality of resource blocks.

According to one aspect of the invention there is provided communication system comprising a communication apparatus according to an above aspect and a mobile communication device according to an above aspect.

According to one aspect of the invention there is provided a communication system comprising a base station comprising: means for communicating with a plurality of mobile communication devices of said communication system using a plurality of resource blocks allocated to the mobile communication devices; and means for communicating with a further base station wherein, the means for communicating comprises means for transmitting to and/or for receiving from, the further base station, resource block related information identifying at least one of an overload, interference and a power restriction associated with at least one of said plurality of resource blocks; and a mobile communication device operable to communicate with said base station.

The invention provides, for all methods disclosed, corresponding computer programs or computer program products for execution on corresponding equipment, the equipment itself (equipment such as base station and mobile communication device, or components thereof) and methods of updating the equipment.

BRIEF DESCRIPTION OF DRAWINGS

Exemplary embodiments of the invention will now be described, by way of example, with reference to the accompanying drawings in which.

DETAILED DESCRIPTION OF EXEMPLARY EMBODIMENTS

Overview

Figure 1:
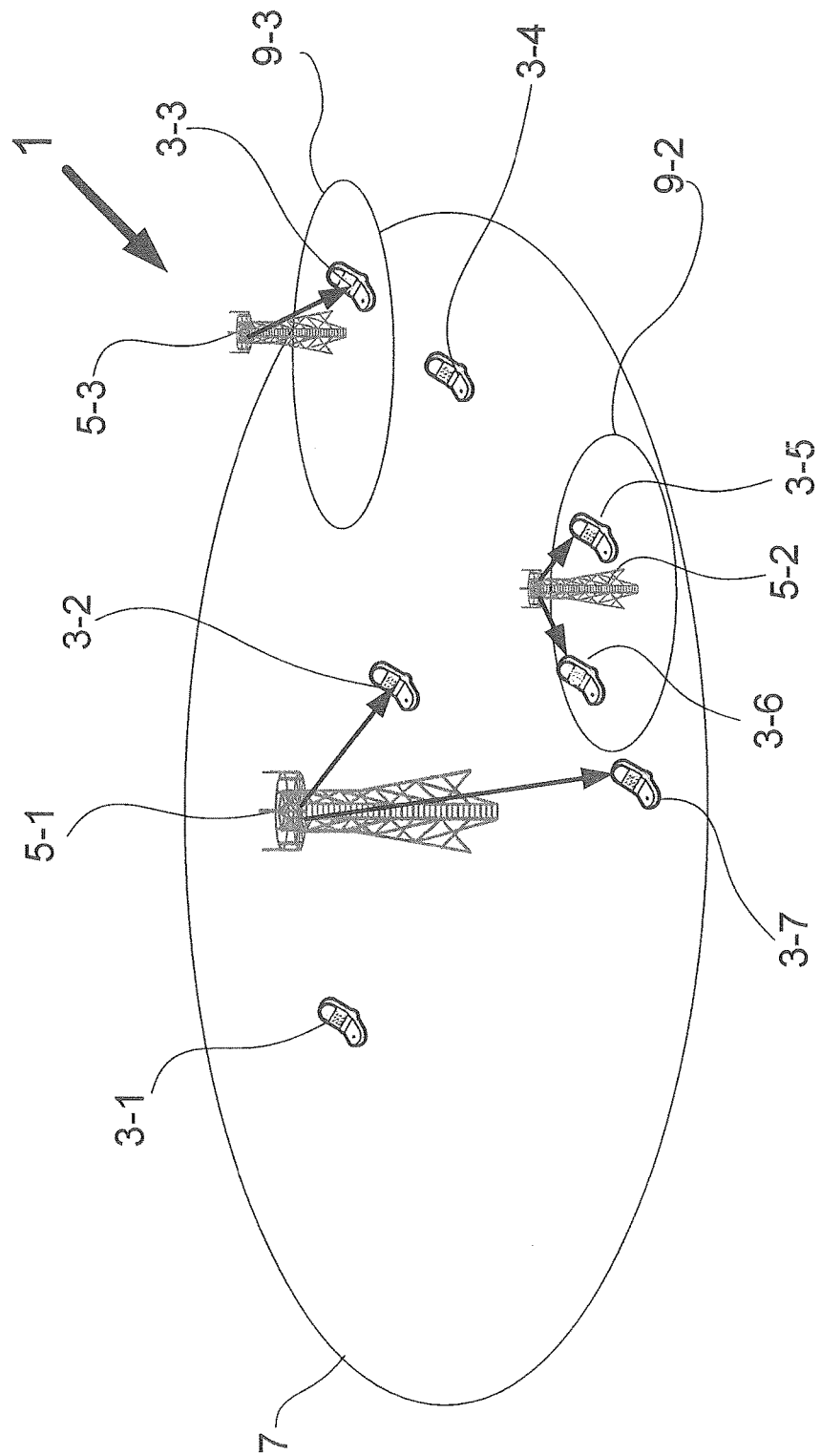
FIG. 1 schematically illustrates a telecommunication system.

FIG. 1 schematically illustrates a mobile (cellular) telecommunication system 1 in which a user of any of a plurality of mobile communication devices 3-1, 3-2, 3-3, 3-4, 3-5, 3-6, 3-7 can communicate with other users via one or more of a plurality of base stations 5-1, 5-2 and 5-3. In the system illustrated in FIG. 1, each base station 5 shown is an Evolved Universal Terrestrial Radio Access Network (E-UTRAN) base station.

In FIG. 1, the base station labelled 5-1 comprises a so called 'macro' base station operating a plurality of relatively geographically large 'macro' cells, such as a macro cell 7. The macro base stations 5-1 is connected to a number of so-called 'pico' base stations 5-2, 5-3 via an X2 interface (not shown), the pico base stations 5-2, 5-3 having relatively small coverage areas, so-called pico cells 9-2 and 9-3, respectively.

The power used to provide pico cells 9 is low relative to the power used for the macro cell 7 and the pico cells 9 are therefore small relative to the macro cell 7. As shown in the example mobile telecommunication system of FIG. 1, the geographical coverage of one pico cell 9-2 falls completely within the geographical coverage of the macro cell 7, whilst the geographical coverage of the other pico cell 9-3 overlaps partially with the geographical coverage of the macro cell 7.

The mobile communication devices 3 located near the boundary of a pico cell 9, such as mobile communication device 3-6 might experience strong interference from the macro cell 7. However, mobile communication devices 3-3, 3-5, which are located closer to the pico base stations 5-2, 5-3 do not suffer from such interference, because at their respective locations the received signal level from the pico base stations 5-2, 5-3 is stronger than the received signal level from macro base station 5-1.

Each base station 5 is configured to send and receive signals in a sequence of radio frames (each typically 10 ms in duration). Each radio frame comprises a plurality of sub-frames (typically 1 ms in duration), each of which comprises a pair of slots (typically 0.5 ms in duration). Each slot is divided in time into a plurality of symbols (typically 6 or 7 depending on whether a normal or extended cyclic prefix is used) and in frequency into a plurality of sub-carriers thereby defining a multiplicity of individual resource elements each of which is characterized by an individual sub-carrier frequency and symbol. The time-frequency resources are typically allocated in blocks (termed 'resource blocks') each of which comprises the resource elements of 12 consecutive sub-carriers and the symbols of one slot.

The radio frames carry control and data signals between the base stations 5 and the mobile communication devices 3. The base station 5 dynamically allocates resource blocks to the mobile communication devices 3 in dependence of current transmission needs, device capabilities, system conditions and other static or dynamic parameters. The transmission power of the allocated resources can be controlled individually by the base station 5. As the skilled person would appreciate, mobile communication devices 3 located closer to a base station 5 can be served using a lower transmission power than mobile communication devices 3 located at a greater distance. Therefore, resources for mobile communication devices 3 at a close proximity to the base stations 5 can be transmitted at a relatively lower power level than resource blocks for mobile communication devices 3 located nearer the boundary of the cells 7, 9.

Some of the sub-frames are designated so called almost blank sub-frames (or ABS), which comprise resource elements that are either transmitted at substantially zero power (zero power ABS) or reduced power (non-zero power ABS).

In the system shown on FIG. 1, the base stations 5 coordinate their transmission scheduling and in their transmission powers so that inter-cell interference is avoided or reduced. The base stations 5 exchange info on ABS pattern and ABS transmit power. The base stations 5 also inform each other when the current (non-zero) ABS transmit power causes inter-cell interference in order to further adjust their transmit power.

In the system illustrated on FIG. 1, the mobile communication devices 3 are also informed about the ABS pattern e.g. via higher layer signaling. The sequence of ABS sub-frames in the series of transmitted sub-frames can be semi-statically configured by the base station, and this configuration is referred to as the ABS pattern. The ABS pattern can be sent to the mobile communication devices 3 using higher layer signaling, such as RRC layer signalling.

In Rel-10, the mobile communication device 3 does not actually know the ABS pattern, only the two measurement subsets signalled as "csi-MeasSub-frameSet1-r10" and "csi-MeasSub-frameSet2-r10". However, when reduced power offsets for ABS are signalled to the mobile communication device 3, the mobile communication device 3 needs to apply them to the correct CSI measurement sub-frame set.

However, the ABS pattern can be configured semi-statically, and one of the configured sub-frame subsets can be allocated to the ABS sub-frames and the other one to the non-ABS sub-frames. If the ABS pattern changes, RRC reconfiguration message is sent to the mobile communication device 3 to reconfigure the "csi-MeasSub-frameSet".

Since the mobile communication device 3 needs to know the full ABS pattern in order to apply the correct offset, at least for CRS based transmission, the following alternatives are provided:

1) Static configuration: e.g. "csi-MeasSub-frameSet1-r10" is for ABS and "csi-MeasSub-frameSet2-r10" is for non-ABS. Network has to equate at least one of the "csi-Measub-frameSet-r11" to ABS pattern (for example "csi-Measub-frameSet1-r11=ABS pattern")

2) Semi-static signalling (e.g. RRC signalling) of the ABS pattern to the mobile communication device 3

Once the ABS pattern is configured for the mobile communication device 3, the mobile communication device 3 can carry out signal measurements on the sub-frames, including the ABS sub-frames. The mobile communication device 3 also sends CQI reports based on the result of the signal measurements.

Apart from interference, many other conditions affect the transmission between base stations 5 and mobile communication devices 3. Therefore, mobile communication devices 3 are configured to provide regular feedback to their base station 5 about the perceived signal quality. The feedback is based on signal measurements performed during the periods when the given mobile communication device 3 is not scheduled to communicate with the base stations 5. Based on the result of measurements, the mobile communication device 3 generates and sends a report back to the base station 5. This feedback mechanism is called channel quality indication (CQI) and, it is employed to fine-tune the operation of the base stations 5, including resource allocation, scheduling and power of transmission.

Furthermore, the base stations 5 coordinate their scheduled transmissions so that the macro base station 5-1 employs brief, relatively silent periods during which the pico base stations 5-2, 5-3 can schedule for the mobile communication devices 3 located near the boundary of pico cells 9. These relatively silent periods can be in the form of so-called almost blank sub-frames, which comprise resource elements transmitted at a reduced power. Therefore, if scheduled to receive from the pico base station 5-2 whilst the macro base station 5-1 transmits an almost blank sub-frame, the mobile communication device 3-6 will not experience inter-cell interference from the macro cell 7. Further details of the almost blank sub-frames will be described below with reference to FIG. 2.

Figure 2:
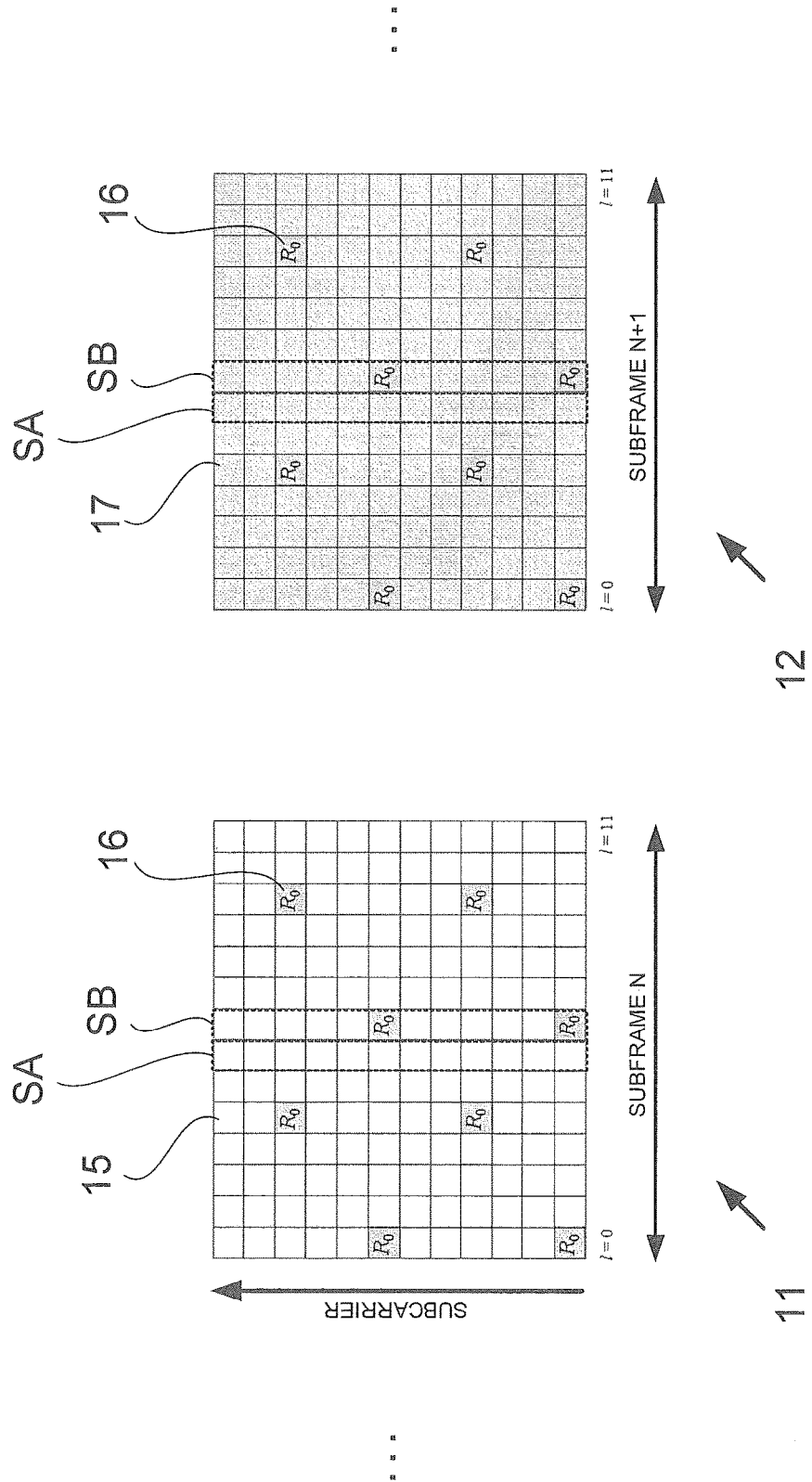
FIG. 2 shows an illustration of typical sub-frames used for communication in the telecommunication system of FIG. 1.

FIG. 2 illustrates, generally at 11, a typical resource grid of a sub-frame in a series of sub-frames 11, 12, etc., in which the resource elements include resource elements 15 used for physical downlink shared channel (PDSCH) signalling and resource elements 16 used for common (cell-specific) reference signaling (CRS). The skilled person would understand that some of the resources are allocated for other purposes, such as control signalling, and have been omitted here for the sake of simplicity. Each row represents a subcarrier frequency and each column, represents a symbol, and comprises a set of resource elements across the subcarrier frequencies of the given resource grid.

As seen in FIG. 2, in the example shown, CRSs are communicated in eight resources 16 distributed generally evenly throughout the resource grid using four distinct sub-carrier frequencies (rows) and four distinct symbol numbers (columns). Thus some symbols, for example symbol SA, comprise only PDSCH resources 15, while other symbols, such as symbol SB, comprise PDSCH resources 15 and CRS resources 16.

The CRS symbols 16 are transmitted at a predefined reference signal energy per resource element (RS EPRE) denoted by $R_0$. The PDSCH resources 15 are transmitted at a PDSCH EPRE value, which is configured by the base station 5 and might be different than the RS EPRE. Depending on this configuration and whether a symbol comprises PDSCH resources 15 only or both PDSCH resources 15 and CRS resources 16, the overall energy level per symbol can vary. As described in section 5.2 of 3GPP TS 36.213 v10.4.0, the mobile communication devices 3 are informed about the relationship between the cell specific RS EPRE and PDSCH EPRE by receiving the symbol dependent power ratios $\rho_A$ and $\rho_B$ from their respective base stations 5. Specifically, the symbol dependent power ratios $\rho_A$ and $\rho_B$ are derived from the higher layer signalled mobile communication device specific parameter $P_A$ and cell specific parameter $P_B$ (also referred to as P_A and P_B, respectively).

Thus, when the mobile communication devices 3 perform channel quality measurements over the various symbols SA, SB, they can also take into account of the respective symbol dependent power ratios $\rho_A$ and $\rho_B$ to provide an appropriate CQI to the base stations 5.

FIG. 2 also illustrates, generally at 12, a typical resource grid of an ABS, in which CRS resources 16 are transmitted at $R_0$, while PDSCH resources 17 are transmitted at a reduced EPRE. As described above, ABS 12 may be used to reduce or avoid inter-cell interference.

The ABS 12 comprises a series of symbols in columns, such as symbol SA with PDSCH resource elements 17 only and symbol SB with both PDSCH resource elements 17 and CRS resource elements 16. While the CRS resource elements 16 are transmitted at the same RS EPRE level as in case of the previous sub-frame 11, the reduced EPRE PDSCH resources 17 have a significantly lower energy level than the PDSCH resource elements 15 of the previous sub-frame 11.

As described previously, the transmission power used for data and the like will not be the same for a non-ABS sub-frame 11 as for an ABS sub-frame 12. However, when reduced transmission power is applied in an ABS sub-frame 12, the CRS resources elements 16 in both an ABS sub-frame 12 and a non-ABS sub-frame 11 are still transmitted at the same power. Consequently, using the power ratios $\rho_A$ and $\rho_B$ could result in inaccurate interpretation of the signal measurements carried out during the duration of the ABS sub-frame 12, and hence have the potential to cause incorrect reporting of the CQI back to the base station 5.

Advantageously, therefore, the base station provides a sub-frame dependent power offset $\Delta_{ABS}$ that can be used by the mobile communication devices 3 on which to base CQI calculations when an ABS sub-frame 12 is transmitted. The base station 5 is configured to send this sub-frame dependent power offset $\Delta_{ABS}$ to the mobile communication devices 3 via higher layer signaling. The mobile communication devices 3 are configured to use this sub-frame dependent power offset $\Delta_{ABS}$ in conjunction with the symbol dependent power ratios $\rho_A$ and $\rho_B$. For example, the mobile communication devices 3 can use the symbol dependent power ratios $\rho_A$ and $\rho_B$ when non-ABS sub-frames 11 are transmitted by the base station 5, and to use the sub-frame dependent power offset $\Delta_{ABS}$ when ABS sub-frames 12 are transmitted by the base station 5. This beneficially allows the mobile communication devices 3 to interpret the signal measurements correctly, independently of the type of sub-frame, and to provide an accurate CQI report to the base stations 5.

This is particularly advantageous because it allows backwards compatibility to be maintained. Specifically, it avoids the need to extend this range of parameters used to calculate $\rho_A$ and $\rho_B$ by adding further values or by altering the currently specified values, which could result in mobile communication devices operating according to different releases of the standard interpreting the values of $\rho_A$ and $\rho_B$ incorrectly.

As a skilled person will appreciate, more details relating to reference-signal transmit power and the associated power ratios $\rho_A$ and $\rho_B$ can be found in the relevant standards (e.g. 3GPP Release 8/9/10) which specify that the downlink reference-signal transmit power is given by the parameter "referenceSignalPower" provided by higher layers, for example by radio resource control (RRC) signaling. It is further specified that the PDSCH power for a given mobile communication device 3 is relative to the downlink CRS 16 in a sub-frame 11.

The ratio PDSCH EPRE to the cell-specific RS EPRE of symbols not containing reference signals is denoted by the mobile communication device 3 specific parameter $\rho_A$. $\rho_A$ is derived from higher layer signalled parameter $P_A$ with possible values of $\{-6, -4.77, -3, -1.77, 0, 1, 2, 3 \text{ dB}\}$ and the parameter "referenceSignalPower". For backwards compatibility these parameters need to remain fixed.

The ratio PDSCH EPRE to the cell-specific RS EPRE of symbols containing reference signals is denoted by the mobile communication device 3 specific parameter $\rho_B$. $\rho_B$ is derived from $\rho_A$ and cell specific parameter $P_B$ signalled from higher layers.

An overview of the relationship between $\rho_A$ and $\rho_B$ is illustrated in Table 1:

TABLE 1

| $P_B$ | $\rho_B/\rho_A$ | |
|---|---|---|
| | One Antenna Port | Two and Four Antenna Ports |
| 0 | 1 | 5/4 |
| 1 | 4/5 | 1 |
| 2 | 3/5 | 3/4 |
| 3 | 2/5 | 1/2 |

Furthermore, if CSI-RS is configured in a serving cell, a UE shall assume downlink CSI-RS EPRE is constant across the downlink system bandwidth and constant across all sub-frames. $P_C$ is the parameter representing the assumed ratio of PDSCH EPRE to CSI-RS EPRE when UE derives CSI feedback and takes values in the range of $[-8, 15]$ dB with 1 dB step size. Therefore, where CSI-RS, which can be transmitted every 5 ms to 80 ms, is configured for CQI estimation, an additional set of downlink transmission power ratio of PDSCH EPRE to CSI-RS EPRE will also be needed for the ABS sub-frame.

In order to maintain backwards compatibility, only one set of $P_A$ and $P_C$ (the same as in Rel-10) is signalled to the mobile communication device 3. However, power reduction $\Delta_{ABS}$ for the ABS sub-frame 12 relative to $P_A$ or $P_C$ will be sent separately to the mobile communication device 3 via higher layer signaling.

Actual transmission power of PDSCH for CRS based transmission scheme except for transmit diversity with 4 antenna ports which has an additional 3 dB offset:

$\rho_A$ is equal to $\delta_{power\text{-}offset} + \Delta_{ABS} + P_A$ [dB]

Assumed PDSCH power of CRS based feedback except for transmit diversity with 4 antenna ports which has an additional 3 dB offset:

$$\rho_A = P_A + \Delta_{ABS} + \Delta_{offset} \text{ [dB]}$$

Assumed PDSCH power of CSI-RS based feedback:

$P_C + \Delta_{ABS}$ [dB]

Where $\Delta_{ABS}$ is 0 dB for non-ABS sub-frame 11 and is provided by higher layers for ABS sub-frame 12. $\Delta_{ABS}$ can also be UE specific.

In this case $\Delta_{ABS}$ may be added to either "PDSCH-ConfigCommon" or "PDSCH-ConfigDedicated" specified in 3GPP TS 36.331 as an optional information element for Rel-11 and can take values in the range of [−16, 0] dB with 1 dB step size.

Base Station to Base Station Feedback

To alleviate the issue of inter-cell interference, the macro base station 5-1 also employs feedback from the pico base stations 5-2, 5-3. Specifically, the pico base stations 5-2, 5-3 can indicate an interference situation to the macro base station 5-1 by sending an interference overload indication message In the system shown on FIG. 1, the base stations 5 exchange information on the ABS sub-frames, such as the order of such sub-frames in the transmitted series of sub-frames, and the transmit power used for transmitting the ABS sub-frames 12. The base stations 5 also inform each other when the current (non-zero) ABS transmit power causes inter-cell interference in order to further adjust their transmit power. This is achieved by using the Load Indication procedure described in section 8.3.1 of the 3GPP TS 36.423, which will be summarized below.

The TS 36.423 standard describes that an eNB (i.e. the base station 5) initiates the procedure by sending LOAD INFORMATION message to eNBs (i.e. the base station 5-1) controlling intra-frequency neighbouring cells.

If an UL Interference Overload Indication information element (IE) is received in the LOAD INFORMATION message, it indicates the interference level experienced by the indicated cell on all resource blocks, per PRB. The receiving eNB may take such information into account when setting its scheduling policy and shall consider the received UL Interference Overload Indication IE value valid until reception of a new LOAD INFORMATION message carrying an update of the same IE.

If the UL High Interference Indication IE is received in the LOAD INFORMATION message, it indicates, per PRB, the occurrence of high interference sensitivity, as seen from the sending eNB. The receiving eNB should try to avoid scheduling cell edge UEs in its cells for the concerned PRBs. The Target Cell ID IE received within the UL High Interference Information IE group in the LOAD INFORMATION message indicates the cell 7 for which the corresponding UL High Interference Indication is meant. The receiving eNB shall consider the value of the UL High Interference Information IE group valid until reception of a new LOAD INFORMATION message carrying an update.

If the Relative Narrowband Tx Power (RNTP) IE is received in the LOAD INFORMATION message, it indicates, per PRB, whether downlink transmission power is lower than the value indicated by the RNTP Threshold IE. The receiving eNB may take such information into account when setting its scheduling policy and shall consider the received Relative Narrowband Tx Power (RNTP) IE value valid until reception of a new LOAD INFORMATION message carrying an update.

If the ABS Information IE is included in the LOAD INFORMATION message, the ABS Pattern Info IE indicates the sub-frames designated as almost blank sub-frames by the sending eNB for the purpose of interference coordination. The receiving eNB may take such information into consideration when scheduling UEs.

The receiving eNB may use the Measurement Subset IE received in the LOAD INFORMATION message, for the configuration of specific measurements towards the UE.

The receiving eNB shall consider the received information as immediately applicable. The receiving eNB shall consider the value of the ABS Information IE valid until reception of a new LOAD INFORMATION message carrying an update.

If an ABS indicated in the ABS pattern info IE coincides with a MBSFN sub-frame, the receiving eNB shall consider that the sub-frame is designated as almost blank sub-frame by the sending eNB.

If the Invoke Indication IE is included in the LOAD INFORMATION message, it indicates which type of information the sending eNB would like the receiving eNB to send back. The receiving eNB may take such request into account.

If the Invoke Indication IE is set to "ABS Information", it indicates the sending eNB would like the receiving eNB to initiate the Load Indication procedure, with the LOAD INFORMATION message containing the ABS Information IE indicating non-zero ABS patterns in the relevant cells.

The above standard is applicable to the co-existence of time and frequency domain inter-cell interference control (ICIC) in both downlink and uplink when the ABS sub-frame does not contain any data channel scheduling. However, the inventors have realised that the current procedures are not adequate if non-zero power ABS is introduced in the next release (i.e. Rel-11) of the standard, in which (e-)PDCCH, PDSCH and PUSCH channels may be scheduled in a non-zero power ABS sub-frame. The scheduling of these channels during an ABS sub-frame means that the mobile communication devices 3 located near the boundaries of the pico cells 9 will experience undesired inter-cell interference.

In order to alleviate this problem, the Load Indication procedure sent by an eNB to neighbouring eNBs to transfer load and interference co-ordination information between intra-frequency neighbouring cells should be enhanced. An eNB sends a set of the following IEs in the Load Information to transfer interference co-ordination information between intra-frequency neighbouring cells. The receiving eNB shall consider the received information as immediately applicable.

Relative Narrowband Tx Power (RNTP) Information Element

This IE provides an indication on DL power restriction per PRB in a cell and other information needed by a neighbour eNB for interference aware scheduling.

The determination of reported Relative Narrowband TX Power indication RNTP($n_{PRB}$) is defined as follows:

$$RNTP(n_{PRB}) = \begin{cases} 0 & \text{if } \frac{E_A(n_{PRB})}{E_{max\_nom}^{(p)}} \leq RNTP_{threshold} \\ 1 & \text{if no promise about the upper limit of } \frac{E_A(n_{PRB})}{E_{max\_non}^{(p)}} \text{ is made} \end{cases}$$

where $E_A(n_{PRB})$ is the maximum intended EPRE of UE-specific PDSCH REs in OFDM symbols not containing RS in this physical resource block on antenna port p in the considered future time interval; $n_{PRB}$ is the physical resource block number $n_{PRB}=0,\ldots,N_{RB}^{DL}-1$; $RNTP_{threshold}$ takes on one of the following values $RNTP_{threshold}\in\{-\infty,-11,-10,-9,-8,-7,-6,-5,-4,-3,-2,-1,0,+1,+2+3\}$ [dB]

In Release-11, $E_A(n_{PRB})$ should be the maximum intended EPRE of UE-specific PDSCH/(e-PDCCH) REs in OFDM symbols not containing RS in this physical resource block on antenna port p in the considered future time interval. If non-zero transmission power is supported in ABS, $RNTP_{threshold}$ may be different for non-zero power ABS and non-ABS sub-frame, and different RNTP settings can be applied to ABS sub-frame and non-ABS sub-frame. In current Rel-10 specification, as there is no information element field indicating the sub-frame for which the X2 messaging is applicable, the receiving eNB will not know if the X2 messaging is intended for ABS or non-ABS sub-frame.

Another example is that, when e-PDCCH is present in Rel-11 ABS sub-frame (i.e. non-zero power ABS sub-frame), the corresponding resources (PRBs) of macro cell do not observe the same reduced transmit power defined for PDSCH. The power for e-PDCCH is set independently based on maximum eNB output power and may not observe the reduced power on the ABS sub-frame. Therefore, a separate RNTP signalling is needed for frequency domain ICIC to indicate which PRBs are not observing the reduced power in ABS sub-frames. This frequency domain ICIC for e-PDCCH will need to be signalled to pico cell so that pico cell can avoid scheduling cell edge users in these PRBs in non-zero transmission power ABS and non-ABS sub-frame, respectively.

The invention provides an additional set of RNTP IE to indicate on DL power restriction per PRB in a cell. The invention also provides the following information needed by a neighbour eNB for interference aware scheduling.

DL Over Load Indication (DL OI)

Following the introduction of non-zero transmission power ABS in Rel-11, pico UEs camped on pico eNBs which located within the macro eNB's coverage area may experience totally different interference levels depending on the location of the pico eNB as well as traffic distribution of pico UEs.

In order to maintain coverage as well as to mitigate the interference level experienced at the pico eNBs, macro eNBs may transmit different power level on different PRBs in the non-zero power ABS sub-frame. However, macro eNB does not know the optimal transmit power setting in ABS sub-frame that does not cause high interference to pico UEs since macro eNB does not know the traffic distribution of UEs camped on the pico cells. In case that multiple pico cells exist within macro eNB's coverage area, it becomes useful for pico eNBs to indicate interference level to the macro eNB so that macro eNB can reduce its power on certain PRBs to an optimal level. Therefore, we propose for pico eNB to indicate high interference indication on PRB basis in ABS sub-frame (i.e. non-zero power ABS sub-frame). Pico eNB can work out the interference level on each PRB based on existing RSRP/RSRQ measurement, pathloss estimation as well as CQI reports from UE.

Macro eNB may respond to the DL OL messaging by reducing its transmission power (step by step) on certain PRBs in ABS sub-frame based on overall statistics (e.g. calculated from DL OI in ABS) of all pico eNBs within its coverage area. This is a Self Organising Network (SON) use case, illustrated in FIG. 6.

The invention provides an optional DL Overload Indication IE to Cell Information IE. This IE provides, per PRB, a report on interference overload by indicating the range of PRBs that are affected by the inter-cell interference. This IE also indicates the intensity of the experienced inter-cell interference, such as high, medium, low interference.

In the uplink, in Rel-10, while all users of macro cell 7 can be scheduled in non-ABS sub-frame, no macro cell 7 users can be scheduled in an ABS sub-frame. In case that non-zero transmission power ABS is supported in the next release of the standard (i.e. Rel-11), mobile communication devices 3 near the center of a macro cell 7 may be scheduled in an ABS sub-frame in order to improve system throughput of the macro cell 7. However, it may happen that these mobile communication devices 3 may be close to the cell edge of the pico cells 9. In any case, UL interference levels experienced in ABS and non-ABS sub-frames at the pico base stations 5-2, 5-3 would be different.

The macro base station 5-1 sends the UL HII to pico base station 5-2 or 5-3 (and vice versa) to notify its intention to schedule UEs in an ABS sub-frame, so that pico base stations 5-2, 5-3 can avoid scheduling cell edge mobile communication devices 3 on certain PRBs in the ABS sub-frames indicated by the macro base stations 5-1.

In non-ABS sub-frame, macro eNB may not observe the frequency domain ICIC restriction and schedule all users over all PRBs, or observe a different HII pattern which utilizes higher proportion of PRB resources.

Therefore, the following uplink X2 messaging IEs for frequency domain ICIC are changed:

UL High Interference Indication (HII)

This IE provides, per PRB, a 2 level report on interference sensitivity. In this IE, positions in a bitmap represent PRBs, for which value "1" indicates 'high interference sensitivity' and value "0" indicates 'low interference sensitivity'.

UL Interference Overload Indication (OI)

This IE provides, per PRB, a report on interference overload where eNB indicates the measurements of the average UL interference in each PRB. The UL OI can also be applied in reduced power ABS sub-frame, therefore, if a base station 5 experiences high interference in ABS sub-frame, it sends UL OI to indicate it to the interfering neighbouring base station 5.

Since UL interference levels experienced in ABS and non-ABS sub-frame at the pico eNB may be different over PRBs, the following set of UL HII and UL OI IEs are needed in Rel-11:

additional set of UL HII IE relating non-zero power ABS sub-frames in the Cell Information IE for frequency domain ICIC messaging in one Load Indication procedure, and additional set of UL OI IE relating non-zero power ABS sub-frames in the Cell Information IE for frequency domain ICIC messaging in one Load Indication procedure.

In summary, in order to support non-zero transmission power in ABS, it is necessary to enhance the X2 Load Indication message:

(1) Add an optional enumeration information element field taking values of 'ABS', 'non-ABS' to indicate the corresponding sub-frame for which the Cell Information IE is applicable. If not present, the Cell Information IE in Load Information for frequency domain ICIC will be applicable to both ABS and non-ABS sub-frame; this is so that backward compatibility is maintained for Rel-10 UEs.

(2) Add additional set of Cell Information IE optionally in one Load Indication procedure for ABS sub-frame to allow simultaneous update of Cell Information IE for ABS and non-ABS sub-frame. Existing Cell Information IE for non-ABS sub-frame can be reused.

Base Station

Figure 3:
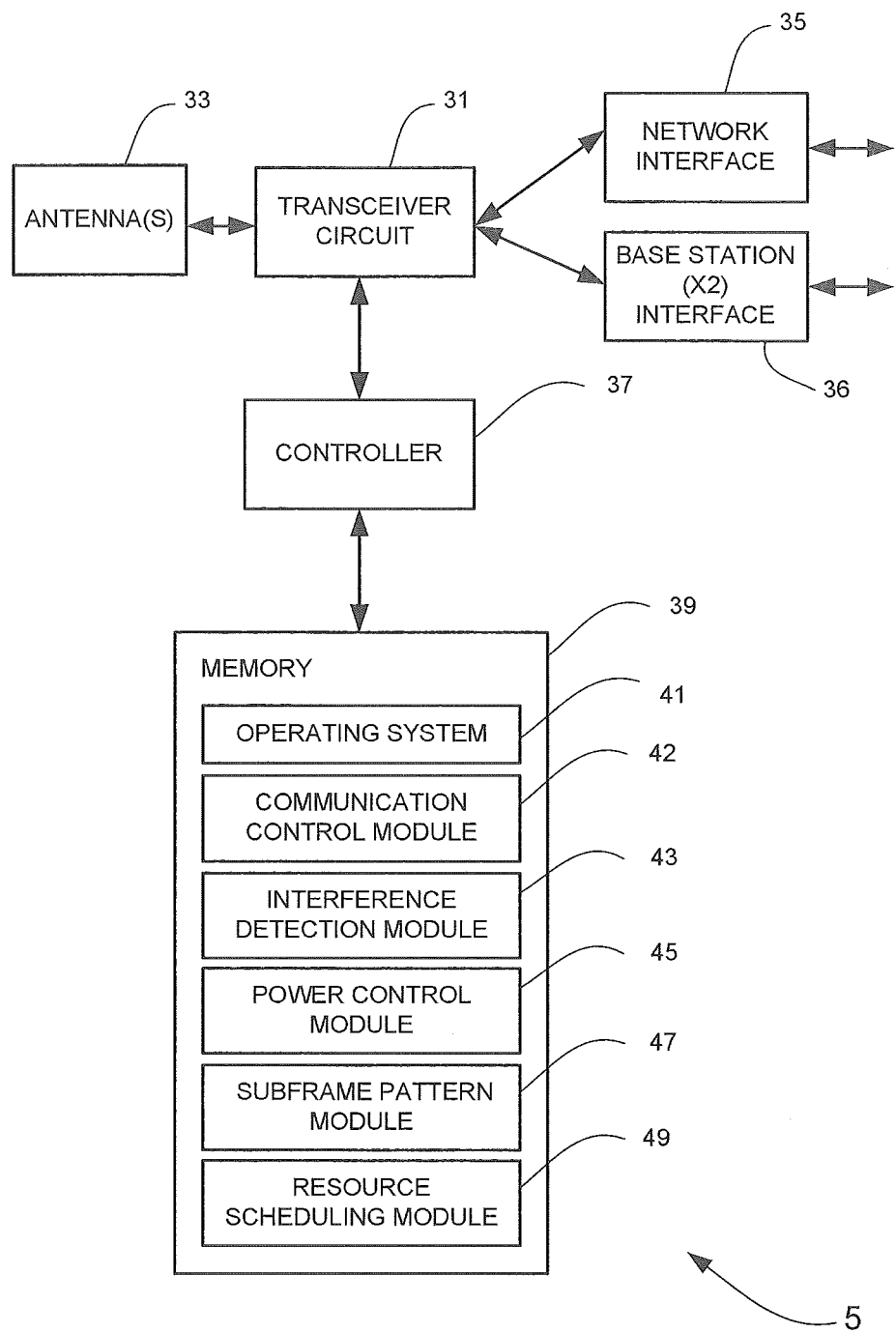
FIG. 3 shows a simplified block diagram of the main components of a base station shown in FIG. 1.

FIG. 3 is a block diagram illustrating the main components of the base stations 5 shown in FIG. 1. For clarity, the base stations will be described with reference to the macro base station 5-1, but it will be appreciated that each of the pico base stations 5-2, 5-3 may be configured similarly. The macro base station 5-1 comprises an E-UTRAN multi-carrier capable base station comprising a transceiver circuit 31 which is operable to transmit signals to, and to receive signals from, the mobile communication devices 3 via at least one antenna 33. The base station 5-1 is also operable to transmit signals to and to receive signals from: a core network via a network interface 35; and other base stations 5 in the vicinity via a base station via a base station (or so called 'X2') interface 36. The operation of the transceiver circuit 31 is controlled by a controller 37 in accordance with software stored in a memory 39.

The software includes, among other things, an operating system 41, a communication control module 42, an interference detection module 43, a power control module 45, a sub-frame pattern module 47, and a resource scheduling module 49.

The communication control module 42 is operable to control communication with the mobile communication devices 3 within cell 7 and with the core network and other base stations via the network interface 35. The interference detection module 43 is operable to detect inter-cell interference caused by (or caused to) neighbouring base stations 5. The power control module 45 is operable to control the transmit power of the transmitted symbols SA, SB and resources 15, 16, 17. The sub-frame pattern module 47 manages the pattern of sub-frames 11 and ABS sub-frames 12 in the transmitted series of sub-frames. The resource scheduling module 49 is responsible for scheduling transmissions to the mobile communication devices 3 served by this base station 5-1.

In the above description, the base station 5-1 is described for ease of understanding as having a number of discrete modules. Whilst these modules may be provided in this way for certain applications, for example where an existing system has been modified to implement the invention, in other applications, for example in systems designed with the inventive features in mind from the outset, these modules may be built into the overall operating system or code and so these modules may not be discernible as discrete entities.

Mobile Communication Device

Figure 4:
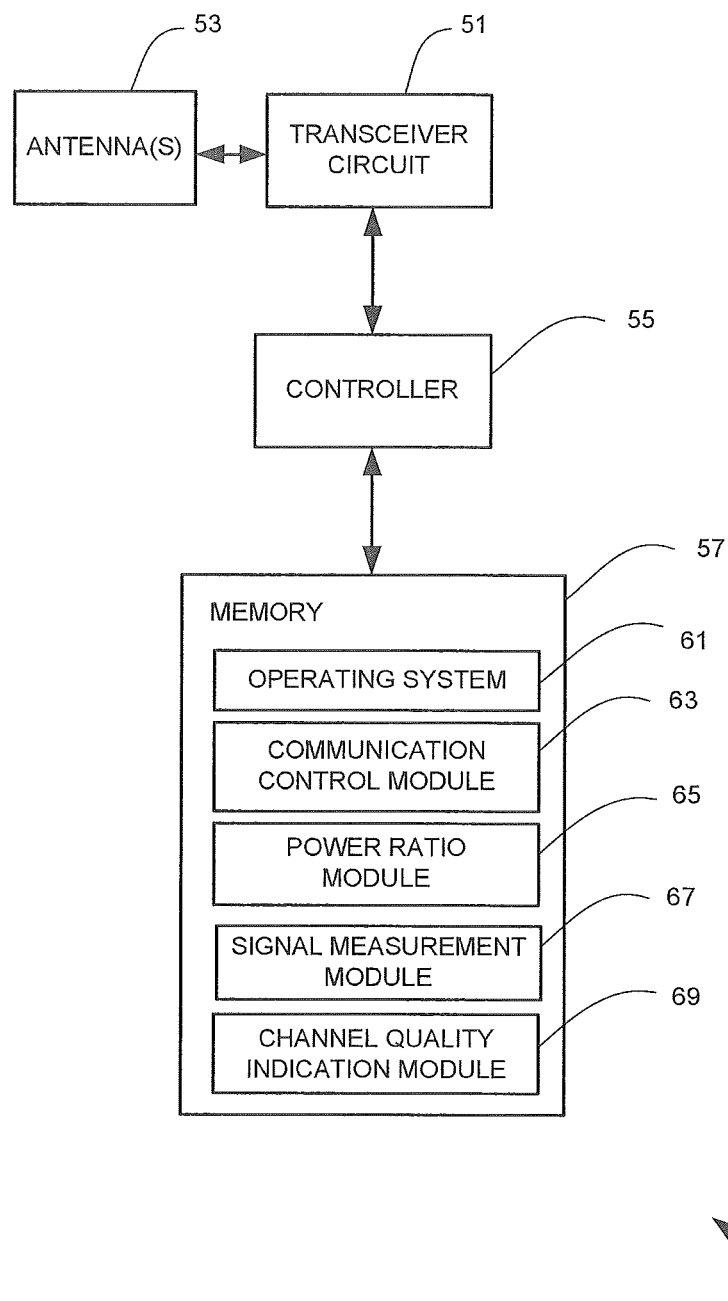
FIG. 4 shows a simplified block diagram of the main components of the mobile communication device shown in FIG. 1.

FIG. 4 is a block diagram illustrating the main components of the mobile communication devices 3 shown in FIG. 1. Each mobile communication device 3 comprises a transceiver circuit 51 which is operable to transmit signals to, and to receive signals from, the base stations 5 via at least one antenna 53. The operation of the transceiver circuit 51 is controlled by a controller 55 in accordance with software stored in a memory 57.

The software includes, among other things, an operating system 61, a communication control module 63, a power ratio module 65, a signal measurement module 67, and a channel quality indication module 69.

The communication control module 63 is operable for managing communication with the base stations 5 serving the cell 7, 9, in which the mobile communication device 3 is located. The communication control module 63 manages communications between base stations 5 and the mobile communication device 3 according to the schedule determined by the base stations 5.

The power ratio module 65 is operable for maintaining the current symbol dependent power ratios $\rho_A$ and $\rho_B$ and the sub-frame dependent power ratio $\Delta_{ABS}$ provided by the base stations 5.

The signal measurement module 67 carries out measurements of the received transmit power over the symbols transmitted by the base stations 5. The signal measurement module 67 is operable to use the appropriate power ratios stored in the power ratio module 65 when carrying out these measurements.

The channel quality indication module 69 prepares the channel quality indication (CQI) reports to be sent to the base stations 5 in accordance with the measurements carried out by the signal measurement module 67.

In the above description, the mobile communication device 3 is described for ease of understanding as having a number of discrete modules. Whilst these modules may be provided in this way for certain applications, for example where an existing system has been modified to implement the invention, in other applications, for example in systems designed with the inventive features in mind from the outset, these modules may be built into the overall operating system or code and so these modules may not be discernible as discrete entities.

Channel Quality Measurement

A more detailed description of some of the novel aspects of the operation of the base station 5 and of the mobile communication device 3 will now be given.

Figure 5:
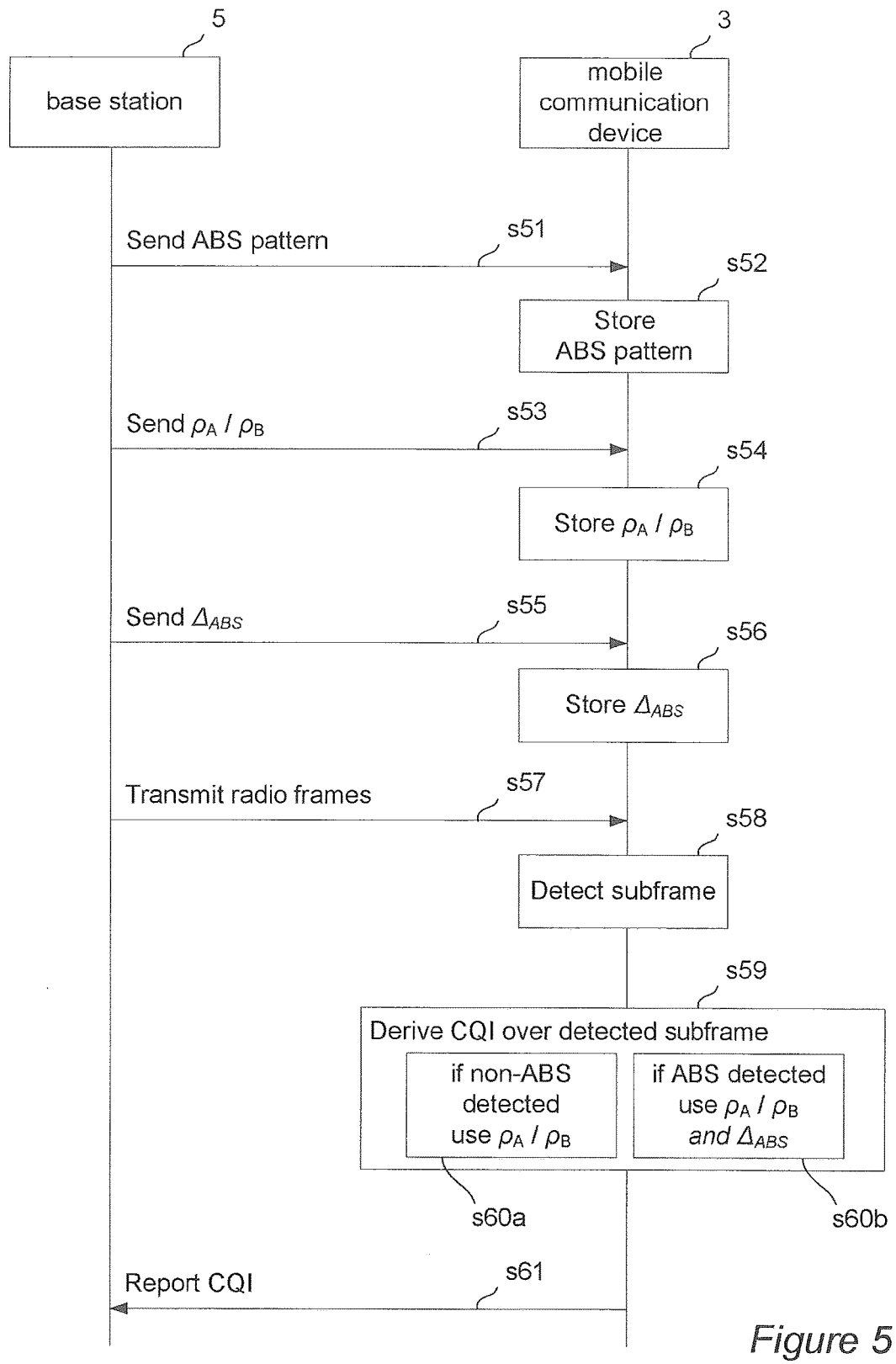
FIG. 5 is a timing diagram illustrating the procedure followed by the base station and the mobile communication device according to an embodiment of the invention.

FIG. 5 is timing diagram illustrating the steps performed by the base station 5 and mobile communication device 3 according to the invention.

At the first step s51, the base stations 5 sends the ABS pattern (if available) to the mobile communication device 3. This can be done via higher layer signaling, which might comprise an exchange of several messages between the base station 5 and the mobile communication device 3, which are not indicate here. The mobile communication device 3 then stores the received pattern, in step s52.

Next, in step s53, the base station 5 sends the symbol dependent power ratios $\rho_A$ and $\rho_B$ to the mobile communication device 3. The mobile communication device 3 stores the symbol dependent power ratios $\rho_A$ and $\rho_B$, in step s54. Preferably, steps s53 and s54 are performed in a backward compatible way.

Next, in step s55, the base station 5 sends the sub-frame dependent power ratio $\Delta_{ABS}$ to the mobile communication device 3. Following receipt of the sub-frame dependent power ratio $\Delta_{ABS}$, the mobile communication device 3 stores it, in step s56.

After sending both the symbol dependent power ratios $\rho_A$ and $\rho_B$ and the sub-frame dependent power ratio $\Delta_{ABS}$ (and the optional ABS pattern) to the mobile communication device 3, the base station 5 transmits radio frames, in step s57, over which the mobile communication device 3 can perform signal quality measurements in order to report CQI to the base station 5. In order to carry out signal quality measurements, the mobile communication device 3, in step s58, detects sub-frames in the radio frames transmitted by the base station 5.

Next, in step s59, the mobile communication device 3 derives a channel quality indication appropriate for the measured signals over the detected sub-frame. This step depends on whether normal, i.e. non-ABS, sub-frame 11 or ABS sub-frame 12 was detected in step s58. In case a non-ABS sub-frame 11 is detected, the signal quality measurements use the symbol dependent power ratios $\rho_A$ and $\rho_B$ (shown here as step s60a). In case an ABS sub-frame 12 is detected at step s58, the signal quality measurements use the symbol dependent power ratios $\rho_A$ and $\rho_B$ and also the sub-frame dependent power ratio $\Delta_{ABS}$ (shown here as step s60b).

After the CQI for the type of sub-frame has been derived, the mobile communication device 3 reports the CQI to the base station 5, in step s61.

Steps s51 and s52 are repeated whenever there is a change in the ABS pattern. Similarly, steps s53 and s54 are repeated when the mobile communication device 3 specific values of the symbol dependent power ratios $\rho_A$ and $\rho_B$ change. Steps s55 and s56 are repeated whenever the sub-frame dependent power ratio $\Delta_{ABS}$ changes.

The signal quality measurements (i.e. steps s58 to s61) can be carried out by the mobile communication device 3 at predefined times, which might even be periodic or per request of the base station 5 serving the given mobile communication device 3.

Advantages

The embodiments described above offer a number of advantages including:

Signaling the new sub-frame dependent power offset $\Delta_{ABS}$ to mobile communication devices 3 allows correct interpretation of the $P_A$ and $P_C$ range while also maintaining compatibility with mobile communication devices operating according to an earlier release of the standard.

The sub-frame dependent power offset $\Delta_{ABS}$ allows the mobile communication devices operating according to different releases of the standard to report the CQI for the ABS sub-frames correctly. At the same time, the invention provides a cell specific offset for ABS sub-frames via PDSCH-ConfigCommon for mobile communication devices operating according to Rel-11.

Modifications and Alternatives

Detailed embodiments have been described above. As those skilled in the art will appreciate, a number of modifications and alternatives can be made to the above embodiments whilst still benefiting from the inventions embodied therein. By way of illustration only a number of these alternatives and modifications will now be described.

In Rel-10, the value range of $P_A$ is limited to {−6 dB, −4.77 dB, −3 dB, −1.77 dB, 0 dB, 1 dB, 2 dB, 3 dB}. In case that $P_A$ is set to −6 dB, there will not be lower values of $P_A$ that can be used for the ABS sub-frames. Therefore, necessity of increasing the ranges of $P_A$ values needs some discussion in RAN1.

In case that CRS-based transmission mode is used in the serving cell, add an optional information element IE PDSCH-ConfigDedicated-ABS to the IE PhysicalConfigDedicated information element in 3GPP TS 36.331.

```
PDSCH-ConfigDedicated-ABS::= SEQUENCE {
    p-a   ENUMERATED {
        dB-22, dB-18, dB-15, dB-12, dB-9, dB-8, dB-7, dB-6,
        dB-4dot77, dB-3, dB-1dot77, dB0, dB1, dB2, dB3}
}
```

Alternatively:
p-a-r11-ABS INTEGER (−22.3)

Similarly, in case that CSI-RS is configured in a serving cell, add an optional information element p-C-r11-ABS to the IE CSI-RS-Config.

p-C-r11-ABS INTEGER (−24.15)

In an exemplary embodiment where the invention is implemented in an LTE system, the macro base station will typically be formed by an LTE base station. The base stations may operate autonomously in a de-centralised manner taking decisions about their respective localities without communicating with a higher network entity. The base stations may also co-operate with each other exchanging information over their "X2" interface and taking decisions based on information received from neighbouring base stations.

Although various aspects of the invention have been illustrated using a specific implementation of the physical layer protocol according to an LTE system, other systems and various low-layer protocols might be used as well.

In the example mobile telecommunication system of FIG. 1, the geographical coverage of one pico cell 9-2 falls completely within the geographical coverage of the macro cell 7, whilst the geographical coverage of the other pico cell 9-3 overlaps partially with the geographical coverage of the macro cell 7. However, other arrangements are also possible. For example, some pico cells might be completely outside the area of the macro cell 7, while other pico cells 9 might overlap with each other as well. In some cases, the same base station 5 might operate any number of macro and pico cells 7, 9 simultaneously. In yet another exemplary embodiment, the macro cell 7 and pico cell 9 form part of two separate telecommunication networks.

At the description of the timing diagram of FIG. 5, step s55 is shown after step s53. However, in an alternative exemplary embodiment, step s55 might coincide with, or precede step s53. Furthermore, the sub-frame dependent power ratio $\Delta_{ABS}$ can be arranged to comprise the symbol dependent power ratios $\rho_A$ and $\rho_B$ as well. In this case, step s53 can be omitted.

In the above exemplary embodiments, a mobile telephone based telecommunications system was described. As those skilled in the art will appreciate, the signaling techniques described in the present application can be employed in other communications system. Other communications nodes or devices may include user devices such as, for example, personal digital assistants, laptop computers, web browsers, etc. As those skilled in the art will appreciate, it is not essential that the above described system be used for mobile communications devices. The system can be used to improve a network having one or more fixed computing devices as well as or instead of the mobile communicating devices.

In the above exemplary embodiments, a number of software modules were described. As those skilled in the art will appreciate, the software modules may be provided in compiled or un-compiled form and may be supplied to the node as a signal over a computer network, or on a recording medium. Further, the functionality performed by part or all of this software may be performed using one or more dedicated hardware circuits. However, the use of software modules is preferred as it facilitates the updating of the node in order to update its functionality. Similarly, although the above embodiments employed transceiver circuitry, at least some of the functionality of the transceiver circuitry can be performed by software.

Various other modifications will be apparent to those skilled in the art and will not be described in further detail here.

The following is a detailed description of the way in which the present inventions may be implemented in the currently proposed 3GPP standards. Whilst various features are described as being essential or necessary, this may only be the case for the proposed 3GPP standard, for example due to other requirements imposed by the standard. These statements should not, therefore, be construed as limiting the present invention in any way.

3GPP TSG RAN WG1 Meeting #68 R1-120888
Source: NEC Group
Title: Signaling support for non-zero transmission power ABS
Agenda item: 7.3.1
Document for: Discussion and Decision

1. INTRODUCTION

In RAN1 #67, it was agreed to study signalling support for non-zero transmission power in ABS as follows [1]:
  Reduced non-zero transmit power on DL unicast control and data transmissions in ABS is needed
  Detailed signalling is FFS
In this contribution, we discuss the detailed signaling for the reduced non-zero transmit power on DL unicast data and control transmissions in ABS.

2. DISCUSSION 2.1 Signaling Support for Reduced Macro Cell Transmission Power in ABS In Rel-10, the allocation of downlink transmission power is signalled to the UE by configuring the ratio of PDSCH EPRE to cell-specific RS EPRE among PDSCH REs (not applicable to PDSCH REs with zero EPRE) for each OFDM symbol is denoted by either $\rho_A$ or $\rho_B$ as described in section 5.2 of [2]. Where $\rho_A$ and $\rho_B$ are derived from higher layer signalled UE specific parameter $P_A$ and cell specific parameter $P_B$.

However, these values may not be the same for the non-ABS sub-frame and ABS sub-frame if reduced transmission power is supported in ABS sub-frame. When reduced macro transmission power is applied in ABS sub-frame, the same level of transmission power shall be allocated for CRS in ABS sub-frame as well as in non-ABS sub-frame. Therefore, in order for UE to be able to perform PDSCH demodulation and generate correct CQI reporting subset for the ABS sub-frame, the UE needs to know the offset between PDSCH EPRE and CRS EPRE in ABS sub-frame.

In this discussion, we assume that all transmission modes should support reduced power ABS sub-frames.

Furthermore, if CSI-RS is configured in a serving cell, a UE shall assume downlink CSI-RS EPRE is constant across the downlink system bandwidth and constant across all sub-frames [2]. As described in [2] section 7.2.5, $P_C$ is the parameter representing the assumed ratio of PDSCH EPRE to CSI-RS EPRE when UE derives CSI feedback and takes values in the range of [−8, 15] dB with 1 dB step size [2]. Therefore, where CSI-RS, which can be transmitted every 5 ms to 80 ms, is configured for CQI estimation, an additional set of downlink transmission power ratio of PDSCH EPRE to CSI-RS EPRE will also be needed for the ABS sub-frame.

Proposal: Consider additional set of signalling for supporting different transmit power offsets of PDSCH with respect to CRS/CSI-RS in ABS sub-frame.

Option 1

In Rel-10, the value range of $P_A$ is limited to {−6 dB, −4.77 dB, −3 dB, −1.77 dB, 0 dB, 1 dB, 2 dB, 3 dB} [4]. In case that $P_A$ is set to −6 dB, there will not be lower values of $P_A$ that can be used for the ABS sub-frames. Therefore, necessity of increasing the ranges of $P_A$ values needs some discussion in RAN1.

In case that CRS-based transmission mode is used in the serving cell, add an optional information element IE PDSCH-ConfigDedicated-ABS to the IE PhysicalConfigDedicated information element [3].

```
PDSCH-ConfigDedicated-ABS::= SEQUENCE {
  p-a                      ENUMERATED {
                              dB-22, dB-18, dB-15, dB-12, dB-9,
                              dB-8, dB-7, dB-6, dB-4dot77,
                              dB-3, dB-1dot77, dB0, dB1,
                              dB2, dB3}
}
```

Or p-a-r11-ABS INTEGER (−22.3)
Similarly, in case that CSI-RS is configured in a serving cell, add an optional information element p-c-r11-ABS to the IE CSI-RS-Config.
p-c-r11-ABS INTEGER (−24.15)

Option 2

Only one set of $P_A$ and $P_C$ is signalled to the UE, which is the same as Rel-10 for non-ABS sub-frame. However, power reduction for the ABS sub-frame relative to $P_A$ or $P_C$ will be sent separately to the UE via higher layer signaling. For example some areas in the specification affected are given below:
  Actual transmission power of PDSCH for CRS based transmission scheme except for transmit diversity with 4 antenna ports which has an additional 3 dB offset (section 5.2 in [2]):

$\rho_A$ is equal to $\delta_{power\text{-}offset} + \Delta_{ABS} + P_A$ [dB]

Assumed PDSCH power of CRS based feedback except for transmit diversity with 4 antenna ports which has an additional 3 dB offset (section 7.2.3 in [2]):

$\rho_A = P_A + \Delta_{ABS} + \Delta_{offset}$ [dB]

Actual transmission power of PDSCH of DM-RS based transmission scheme: Not relevant as $\rho_A$ is not specified.
  Assumed PDSCH power of CSI-RS based feedback (section 7.2.5 in [2]):

$P_c + \Delta_{ABS}$ [dB]

where $\Delta_{ABS}$ is 0 dB for non-ABS sub-frame and provided by higher layers for ABS sub-frame. $\Delta_{ABS}$ can also be UE specific.

In this case $\Delta_{ABS}$ may be added to either PDSCH-ConfigCommon or PDSCH-ConfigDedicated in [3] as an optional information element for Rel-11 and can take values in the range of [−16, 0] dB with 1 dB step size.

|  | Pros | Cons |
| --- | --- | --- |
| Option-1 | Reusing existing parameters in the specifications. | Signalling of two almost similar $P_A$ parameters for one UE, one for non-ABS and one for ABS sub-frames Signalling of two almost similar $P_C$ parameters for one UE, one for non-ABS and one for ABS sub-frame |

|          | Pros | Cons |
|----------|------|------|
| Option-2 | Avoid problem of misunderstanding the new range of $P_A$ and $P_C$ for Rel-10-UE Possibility of correcting reported CQI for ABS by eNB for Rel-10 UEs. | Signaling of new parameter-$\Delta_{ABS}$. |

Furthermore, in Rel-10, UE does not actually know the ABS pattern, it only knows two measurement subsets signalled as "csi-MeasSub-frameSet1-r10" and "csi-MeasSub-frameSet2-r10" [3]. However, when reduced power offsets for ABS are signalled to the UE, the UE needs to apply them to the correct CSI measurement sub-frame set.

The assumption is that the ABS pattern is configured semi-statically, and one of the configured sub-frame subsets will be for 'ABS' and the other one for 'non-ABS'. If the ABS pattern changes, RRC reconfiguration message has to be sent to the UE to reconfigure the 'csi-MeasSub-frame-Set'.

Since UE needs to know the full ABS pattern in order to apply the correct offset, at least for CRS based transmission, some possible solutions are as follows:

1) Static configuration: e.g. "csi-MeasSub-frameSet1-r10" is for ABS and "csi-MeasSub-frameSet2-r10" is for non-ABS. Network has to equate at least one of the csi-Measub-frameSet-r11 to ABS pattern (for example csi-Measub-frameSet1-r11=ABS pattern)
2) Semi-static signalling (e.g. RRC signalling) of the ABS pattern to the UE

3. CONCLUSION

In this contribution, we discussed the detailed signalling for the reduced non-zero transmit power on DL unicast control and data transmissions in ABS. The following proposals were made based on discussions.

Proposal: Consider additional set of signalling for supporting different transmit power offsets of PDSCH with respect to CRS/CSI-RS in ABS sub-frame.

REFERENCES

[1] RAN1 Chairman's Notes, RAN1#67
[2] 3GPP, TS 36.213 (V10.4.0), "E-UTRA; Physical layer procedures", December 2011.
[3] 3GPP TS 36.331, "Evolved Universal Terrestrial Radio Access (E-UTRA); Radio Resource Control (RRC) protocol specification".
3GPP TSG RAN WG1 Meeting
Source: NEC Group
Title: Signaling support for non-zero transmission power ABS
Agenda item: 7.3.1
Document for: Discussion and Decision

1. INTRODUCTION

In RAN1 #67, it was agreed to study signalling support for non-zero transmission power in ABS [1]. In this contribution, we identify the scenarios where additional signaling support is required and propose some possible solutions.

2. DISCUSSION 2.1 Impact on the Coexistence of Time and Frequency Domain ICIC The co-existence of time and frequency domain ICIC when ABS sub-frame does not contain any data channel scheduling has been discussed and clarified in the reply LS to RAN3 [2]. However, if non-zero power ABS is introduced in Rel-11, we have to investigate the coexistence of time and frequency domain ICIC again for the case of non-zero power ABS since (e-)PDCCH, PDSCH and PUSCH may be scheduled in ABS sub-frame. Load Indication procedure is sent by an eNB to neighbouring eNBs to transfer load and interference co-ordination information between intra-frequency neighbouring cells [3].

An eNB sends a set of the following IEs in the Load Information to transfer interference co-ordination information between intra-frequency neighbouring cells. The receiving eNB shall consider the received information as immediately as applicable [3].

2.2 Coexistence of Time and Frequency Domain ICIC in the Downlink Relative Narrowband Tx Power (RNTP) ([4]):

This IE provides an indication on DL power restriction per PRB in a cell and other information needed by a neighbour eNB for interference aware scheduling.

The determination of reported Relative Narrowband TX Power indication $RNTP(n_{PRB})$ is defined as follows:

$$RNTP(n_{PRB}) = \begin{cases} 0 & \text{if } \frac{E_A(n_{PRB})}{E_{max\_nom}^{(p)}} \leq RNTP_{threshold} \\ 1 & \text{if no promise about the upper limit of } \frac{E_A(n_{PRB})}{E_{max\_non}^{(p)}} \text{ is made} \end{cases}$$

where $E_A(n_{PRB})$ is the maximum intended EPRE of UE-specific PDSCH REs in OFDM symbols not containing RS in this physical resource block on antenna port p in the considered future time interval; $n_{PRB}$ is the physical resource block number $n_{PRB}=0, \ldots, N_{RB}^{DL}-1$; $RNTP_{threshold}$ takes on one of the following values $RNTP_{threshold} \in \{-\infty,-11,-10,-9,-8,-7,-6,-5,-4,-3,-2,-1,0,+1,+2+3\}$ [dB]

In Release-11, $E_A(n_{PRB})$ should be the maximum intended EPRE of UE-specific PDSCH/(e-PDCCH) REs in OFDM symbols not containing RS in this physical resource block on antenna port p in the considered future time interval. If non-zero transmission power is supported in ABS, $RNTP_{threshold}$ may be different for non-zero power ABS and non-ABS sub-frame, and different RNTP settings can be applied to ABS sub-frame and non-ABS sub-frame. In current Rel-10 specification [4], as there is no information element field indicating the sub-frame for which the X2 messaging is applicable, the receiving eNB will not know if the X2 messaging is intended for ABS or non-ABS sub-frame.

Another example is that, when e-PDCCH is present in Rel-11 ABS sub-frame (i.e. non-zero power ABS sub-frame), the corresponding resources (PRBs) of macro cell do not observe the same reduced transmit power defined for PDSCH. The power for e-PDCCH is set independently based on maximum eNB output power. The frequency domain location of e-PDCCH may not be the same for ABS and non-ABS subframe. Therefore, a separate RNTP signalling is needed for frequency domain ICIC to indicate which PRBs are not observing the reduced power in ABS sub-frames. This frequency domain ICIC for e-PDCCH will need to be signalled to pico cell so that pico cell can avoid scheduling cell edge users in these PRBs in non-zero transmission power ABS and non-ABS sub-frame, respectively.

Proposal 1: Add additional optional set of RNTP IE to indicate on DL power restriction per PRB in a cell and other information needed by a neighbour eNB for interference aware scheduling.

DL Over Load Indication (DL OI):

Following the introduction of non-zero transmission power ABS in Rel-11, pico UEs camped on pico eNBs which located within the macro eNB's coverage area may experience totally different interference levels depending on the location of the pico eNB as well as traffic distribution of pico UEs.

In order to maintain coverage as well as to mitigate the interference level experienced at the pico eNBs, macro eNBs may transmit different power level on different PRBs in the non-zero power ABS sub-frame. However, macro eNB does not know the optimal transmit power setting in ABS sub-frame that does not cause high interference to pico UEs since macro eNB does not know the traffic distribution of UEs camped on the pico cells. In case that multiple pico cells exist within macro eNB's coverage area, it becomes useful for pico eNBs to indicate interference level to the macro eNB so that macro eNB can reduce its power on certain PRBs to an optimal level. Therefore, we propose for pico eNB to indicate high interference indication on PRB basis in ABS sub-frame (i.e. non-zero power ABS sub-frame). Pico eNB can work out the interference level on each PRB based on existing RSRP/RSRQ measurement, pathloss estimation as well as CQI reports from UE.

Figure 6:
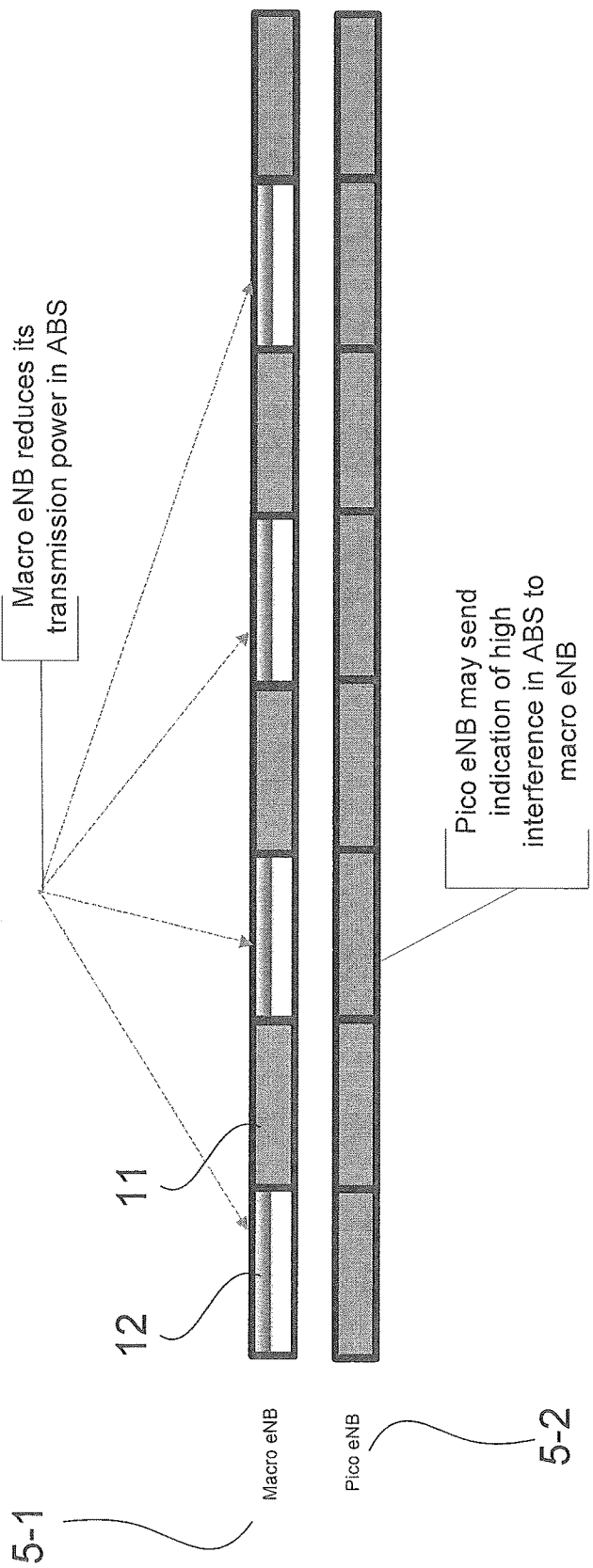
FIG. 6 illustrates the series of radio sub-frames transmitted in parallel by a macro base station and a pico base station.

Macro eNB may respond to the DL OL messaging by reducing its transmission power (step by step) on certain PRBs in ABS sub-frame based on overall statistics (e.g. calculated from DL OI in ABS) of all pico eNBs within its coverage area. This is a SON use case as illustrated in FIG. 6.

Proposal 2: Add optional DL Overload Indication IE to Cell Information IE.

DL Overload Indication

This IE provides, per PRB, a report on interference overload.

| IE/Group Name | Presence | Range | IE type and reference | Semantics description |
|---|---|---|---|---|
| DL Interference | | 1 ... <max noofPRBs> | | |

| IE/Group Name | Presence | Range | IE type and reference | Semantics description |
|---|---|---|---|---|
| Overload Indication List | | | | |
| >DL Interference Overload Indication | M | | ENUMERATED (high interference, medium interference, low interference, ... ) | Each PRB is identified by its position in the list: the first element in the list corresponds to PRB 0, the second to PRB 1, etc. |

| Range bound | Explanation |
|---|---|
| maxnoofPRBs | Maximum no. Physical Resource Blocks. Value is 110. |

2.3 Coexistence of Time and Frequency Domain ICIC in the Uplink

In the uplink, in Rel-10, while all users of macro cell can be scheduled in non-ABS sub-frame, no macro users can be scheduled in ABS sub-frame. In case that non-zero transmission power ABS is supported in Rel-11, macro cell center users may be scheduled in ABS sub-frame in order to improve system throughput of macro cell. However, it may happen that cell centre users of the macro cell may be close to cell edge users of pico cell in HetNet scenario. In any case, UL interference levels experienced in ABS and non-ABS sub-frame at the pico eNB would be different.

The macro eNB may send UL HII to pico eNB (and vice versa) to notify its intention to schedule UEs in Rel-11 ABS sub-frame, so that pico eNB can avoid scheduling cell edge users on certain PRBs in ABS as indicated by the macro eNodeB.

In non-ABS sub-frame, macro eNB may not observe the frequency domain ICIC restriction and scheduled all users over all PRBs, or observe a different HII pattern which utilizes higher proportion of PRB resources.

Therefore, we think there are also impacts on the following uplink X2 messaging IEs [4] for frequency domain ICIC:

UL High Interference Indication (HII) [3]

This IE provides, per PRB, a 2 level report on interference sensitivity.

| IE/Group Name | Presence | Range | IE type and reference | Semantics description |
|---|---|---|---|---|
| HII | M | | BIT STRING (1 ... 110, ... ) | Each position in the bitmap represents a PRB (first bit = PRB 0 and so on), for which value "'1" indicates 'high interference sensitivity' and value "0" indicates 'low interference sensitivity'. |
| The maximum number of Physical Resource Blocks is 110 | | | | |

UL Interference Overload Indication (OI) [3]

The UL OI can also be applied in reduced power ABS sub-frame, therefore, if macro or pico eNB experience high interference in ABS sub-frame, it may send UL OI to indicate to the interfering neighbouring eNBs.

Since UL interference levels experienced in ABS and non-ABS sub-frame at the pico eNB may be different over PRBs, additional set of UL HII and UL OI IEs are needed in Rel-11.

| IE/Group Name | Presence | Range | IE type and reference | Semantics description |
|---|---|---|---|---|
| UL Interference Overload Indication List | | 1 . . . <max noofPRBs> | | |
| >UL Interference Overload Indication | M | | ENUMERATED (high interference, medium interference, low interference, . . . ) | Each PRB is identified by its position in the list: the first element in the list corresponds to PRB 0, the second to PRB 1, etc. |

This IE provides, per PRB, a report on interference overload where eNB indicates the measurements of the average UL interference in each PRB.

| Range bound | Explanation |
|---|---|
| maxnoofPRBs | Maximum no. Physical Resource Blocks. Value is 110. |

Proposal 3: Add additional optional set of UL HII IE relating to non-zero power ABS sub-frames in the Cell Information IE for frequency domain ICIC messaging in one Load Indication procedure.

Proposal 4: Add additional optional set of UL OI IE relating to non-zero power ABS sub-frames in the Cell Information IE for frequency domain ICIC messaging in one Load Indication procedure.

In summary, in order to support non-zero transmission power in ABS, it is necessary to enhance the X2 Load Indication message.

We propose the following solutions:
(1) Add an optional enumeration information element field taking values of 'ABS', 'non-ABS' to indicate the corresponding sub-frame for which the Cell Information IE is applicable. If not present, the Cell Information IE in Load Information for frequency domain ICIC will be applicable to both ABS and non-ABS sub-frame; this is so that backward compatibility is maintained for Rel-10 UEs.
(2) Add additional set of Cell Information IE optionally in one Load Indication procedure for ABS sub-frame to allow simultaneous update of Cell Information IE for ABS and non-ABS sub-frame. Existing Cell Information IE for non-ABS sub-frame can be reused.

3. CONCLUSION

In this contribution, we discussed the impact of reduced power ABS and identified the scenarios where additional signaling support is required in case of co-existence of time and frequency domain ICIC. The following proposals were made based on discussions:

Proposal 1: Add additional optional set of RNTP IE to indicate on DL power restriction per PRB in a cell and other information needed by a neighbour eNB for interference aware scheduling.

Proposal 2: Add optional DL Overload Indication IE to Cell Information IE.

Proposal 3: Add additional optional set of UL HII IE relating to non-zero power ABS sub-frames in the Cell Information IE for frequency domain ICIC messaging in one Load Indication procedure.

Proposal 4: Add additional optional set of UL OI IE relating to non-zero power ABS sub-frames in the Cell Information IE for frequency domain ICIC messaging in one Load Indication procedure.

Proposal 5: Add optional TE indicating for non-ABS subframe or 'non-zero power ABS' subframe the Cell Information IE is applicable. If not present, the Cell Information IB will be applicable to both non-ABS subframe and 'non-zero power ABS' subframe. Note that Cell Information IE in release-10 contains RNTP IE, UL HII IB and UL OI IE.

Adding additional set of Cell Information TE (as in proposal 1 to 4) in one Load Indication procedure will allow simultaneous update of Cell Information IB for non-ABS and 'non-zero power ABS' subframe. If only one Cell Information TE is present, this subframe type indication IB will indicate that the update of Cell Information IE is for either non-ABS subframe or 'non-zero power ABS' subframe.

This application is based upon and claims the benefit of priority from United Kingdom patent application No. 1202216.6, filed on Feb. 8, 2012, the disclosure of which is incorporated herein in its entirety by reference.

REFERENCES

[1] RANI Chairman's Notes, RANI#67
[2] R1-111197, LS reply on coexistence of frequency domain and time domain ICIC, RANI.
[3] 3GPP TS 36.423 V10.4.0: "Evolved Universal Terrestrial Radio Access (E-UTRA); X2 application protocol (X2AP)".
[4] 3GPP, TS 36.213 (V10.4.0), "E-UTRA; Physical layer procedures", December 2011.

The invention claimed is:

1. A mobile communication device for a cellular communication system, the mobile communication device comprising:
   a memory storing instructions; and
   one or more hardware processors configured to execute the instructions to:

communicate with a communication apparatus of said cellular communication system using radio frames that comprise a plurality of sub-frames, receive, from said communication apparatus, information for use in identifying a first power ratio, said first power ratio representing a ratio of a power used by the communication apparatus for transmitting a reference signal to a first power used for transmitting data in a first sub-frame of a radio frame;

receive, from said communication apparatus, an offset for use in identifying a second power ratio from said first power ratio, said second power ratio representing a ratio of a power used by the communication apparatus for transmitting a reference signal to a second power used for transmitting data in a second sub-frame of said radio frame; and transmit to said communication apparatus a measurement report comprising information calculated in dependence on at least one of said first and second power ratio.

2. The mobile communication device of claim 1, wherein said second sub-frame comprises an almost blank sub-frame (ABS).

3. The mobile communication device of claim 1, wherein said second sub-frame comprises a non-zero power almost blank sub-frame (ABS).

4. The mobile communication device of claim 1, wherein said first sub-frame comprises a sub-frame other than an almost blank sub-frame (ABS).

5. The mobile communication device of claim 1, wherein said offset for use in identifying a second power ratio comprises information identifying a difference between said first power ratio and said second power ratio.

6. The mobile communication device of claim 1, wherein said information calculated in dependence on at least one of said first and second power ratio comprises a channel quality indicator (CQI).

7. The mobile communication device of claim 1, comprising a mobile (cellular) telephone.

8. A communication apparatus for a cellular communication system, the communication apparatus comprising:
a memory storing instructions; and
one or more hardware processors configured to execute the instructions to:
communicate with mobile communication devices of said cellular communication system using radio frames that comprise a plurality of sub-frames,
transmit, to a mobile communication device, information for use in identifying a first power ratio, said first power ratio representing a ratio of a power used for transmitting a reference signal to a first power used for transmitting data in a first sub-frame of a radio frame;
transmit, to a mobile communication device, an offset for use in identifying a second power ratio from said first power ratio, said second power ratio representing a ratio of a power used for transmitting a reference signal to a second power used for transmitting data in a second sub-frame of said radio frame; and
receive, from said mobile communication device, a measurement report comprising information calculated in dependence on at least one of said first and second power ratio.

9. The communication apparatus of claim 8, wherein said second sub-frame comprises an almost blank sub-frame (ABS).

10. The communication apparatus of claim 8, wherein said second sub-frame comprises a non-zero power almost blank sub-frame (ABS).

11. The communication apparatus of claim 8, wherein said first sub-frame comprises a sub-frame other than an almost blank sub-frame (ABS).

12. The communication apparatus of claim 8, wherein said offset for use in identifying a second power ratio comprises information identifying a difference between said first power ratio and said second power ratio.

13. The communication apparatus of claim 8, wherein said information calculated in dependence on at least one of said first and second power ratio comprises a channel quality indicator (CQI).

14. The communication apparatus of claim 8, comprising a base station.

15. A method performed by a mobile communication device of a cellular communication system, the method comprising:
communicating with a communication apparatus of said cellular communication system using radio frames that comprise a plurality of sub-frames,
wherein the communicating comprises:
receiving, from said communication apparatus:
information for use in identifying a first power ratio, said first power ratio representing a ratio of a power used by the communication apparatus for transmitting a reference signal to a first power used for transmitting data in a first sub-frame of a radio frame; and
an offset for use in identifying a second power ratio from said first power ratio, said second power ratio representing a ratio of a power used by the communication apparatus for transmitting a reference signal to a second power used for transmitting data in a second subframe of said radio frame; and
transmitting, to said communication apparatus, a measurement report comprising information calculated in dependence on at least one of said first and second power ratio.

16. A method performed by communication apparatus of a cellular communication system, the method comprising:
communicating with mobile communication devices of said cellular communication system using radio frames that comprise a plurality of sub-frames,
wherein the communicating comprises:
transmitting, to a mobile communication device:
information for use in identifying a first power ratio, said first power ratio representing a ratio of a power used for transmitting a reference signal to a first power used for transmitting data in a first sub-frame of a radio frame; and
an offset for use in identifying a second power ratio from said first power ratio, said second power ratio representing a ratio of a power used for transmitting a reference signal to a second power used for transmitting data in a second sub-frame of said radio frame; and
receiving, from said communication device, a measurement report comprising information calculated in dependence on at least one of said first and second power ratio.

17. A mobile communication device for a cellular communication system, the mobile communication device comprising:
a memory storing instructions; and
one or more hardware processors configured to execute the instructions to:
qreceive from communication apparatus, an offset for use in identifying a power ratio representing a ratio of a power used for transmitting a reference signal to a power used for transmitting data in a sub-frame of a radio frame, wherein said power ratio varies in dependence on which sub-frame of said radio frame said power ratio relates to; and generate a measurement report comprising information calculated in dependence on said power ratio.

18. A communication apparatus for a cellular communication system, the communication apparatus comprising;
a memory storing instructions; and
one or more hardware processors configured to execute the instructions to:
transmit to a mobile communication device an offset for use in identifying a power ratio representing a ratio of a power used for transmitting a reference signal to a power used for transmitting data in a sub-frame of a radio frame,
wherein said power ratio varies in dependence on which sub-frame of said radio frame said power ratio relates to.

19. A base station for a cellular communication system, the base station comprising:
a memory storing instructions; and
one or more hardware processors configured to execute the instructions to:
communicate with a plurality of mobile communication devices of said cellular communication system using a plurality of resource blocks allocated to the mobile communication devices;
communicate with another base station; and
transmit to and/or receive from said another base station, resource block related information identifying an interference level associated with at least one of said plurality of resource blocks.

20. A base station as claimed in claim 19, wherein said resource block related information is associated with a resource block of an almost blank sub-frame.

21. A base station as claimed in claim 19, wherein said resource block related information is associated with a resource block of non-zero power almost blank sub-frame.

22. A base station as claimed in claim 19, wherein the one or more hardware processors is further configured to execute the instructions to transmit and/or to receive from said another base station, an indication of whether or not said resource block related information is applicable to a particular sub-frame.

23. A base station as claimed in claim 19, wherein said one or more hardware processors is further configured to execute the instructions to transmit and/or to receive from said another base station, said resource block information in a cell information element (IE).

24. A base station as claimed in claim 19, wherein said resource block information comprises information relating to uplink and/or downlink communication.

25. A base station as claimed in claim 19, wherein said resource block information identifies a power restriction for an associated resource block.

26. A base station as claimed in claim 19, wherein said resource block information indicates whether interference sensitivity is high or low for an associated resource block.

27. A base station as claimed in claim 19, wherein said resource block information comprises respective resource block information associated with each of a plurality of resource blocks.

28. A base station as claimed in claim 19, wherein said one or more hardware processors is further configured to execute the instructions to communicate with said another base station over an X2 interface.

29. A method performed by a base station of a cellular communication system, the method comprising:
communicating with a plurality of mobile communication devices of said cellular communication system using a plurality of resource blocks allocated to the mobile communication devices; and
communicating with another base station,
wherein the communicating comprises transmitting to and/or receiving from, said another base station, resource block related information identifying an interference level associated with at least one of said plurality of resource blocks.

30. A cellular communication system comprising a communication apparatus and a mobile communication device, wherein the communication apparatus comprises:
a memory storing instructions; and
one or more hardware processors configured to execute the instructions to:
communicate with mobile communication devices of said cellular communication system using radio frames that comprise a plurality of sub-frames,
transmit, to the mobile communication device, information for use in identifying a first power ratio, said first power ratio representing a ratio of a power used for transmitting a reference signal to a first power used for transmitting data in a first sub-frame of a radio frame;
transmit, to the mobile communication device, an offset for use in identifying a second power ratio from said first power ratio, said second power ratio representing a ratio of a power used for transmitting a reference signal to a second power used for transmitting data in a second sub-frame of said radio frame; and
receive, from said mobile communication device, a measurement report comprising information calculated in dependence on at least one of said first and second power ratio,
wherein the mobile communication device comprises:
a memory storing instructions; and
one or more hardware processors configured to execute the instructions to:
communicate with the communication apparatus of said cellular communication system using the radio frames, and
receive, from said communication apparatus, information for use in identifying the first power ratio; and
receive, from said communication apparatus, information for use in identifying the second power ratio; and
transmit to said communication apparatus the measurement report.

31. A communication system comprising a base station comprising:
a memory storing instructions; and
one or more hardware processors configured to execute the instructions to:
communicate with a plurality of mobile communication devices of said communication system using a plurality of resource blocks allocated to the mobile communication devices;
communicate with another base station;
transmit to and/or receive from said another base station, resource block related information identifying an interference level associated with at least one of said plurality of resource blocks; and
communicate with said base station.

* * * * *